(No Model.)
2 Sheets—Sheet 1.
R. CORSCADEN.
APPARATUS FOR COLLECTING AND DRYING THE SEDIMENTARY MATTER OF SEWAGE.
No. 315,912. Patented Apr. 14, 1885.
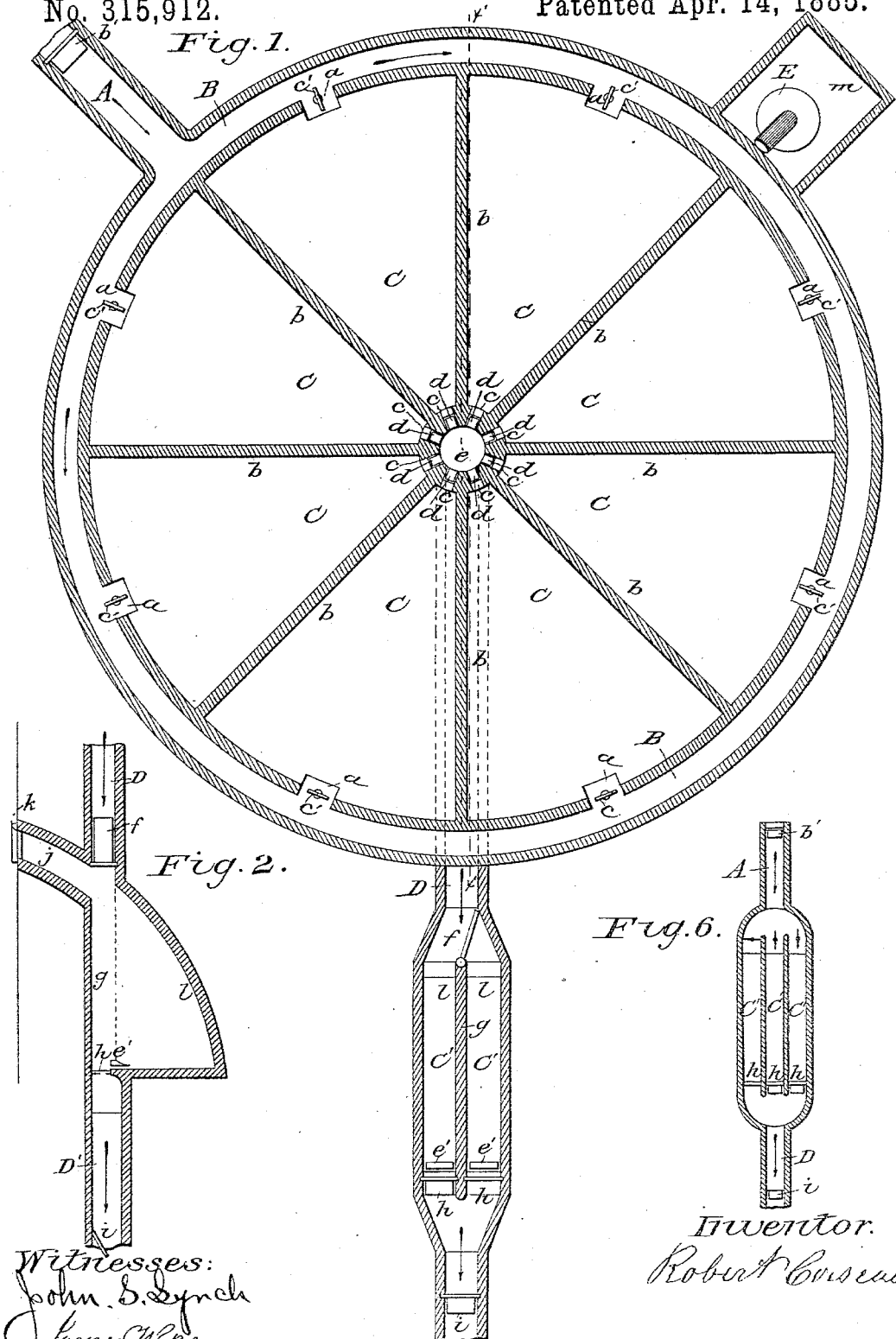

(No Model.) 2 Sheets—Sheet 2.
R. CORSCADEN.
APPARATUS FOR COLLECTING AND DRYING THE SEDIMENTARY MATTER OF SEWAGE.
No. 315,912. Patented Apr. 14, 1885.
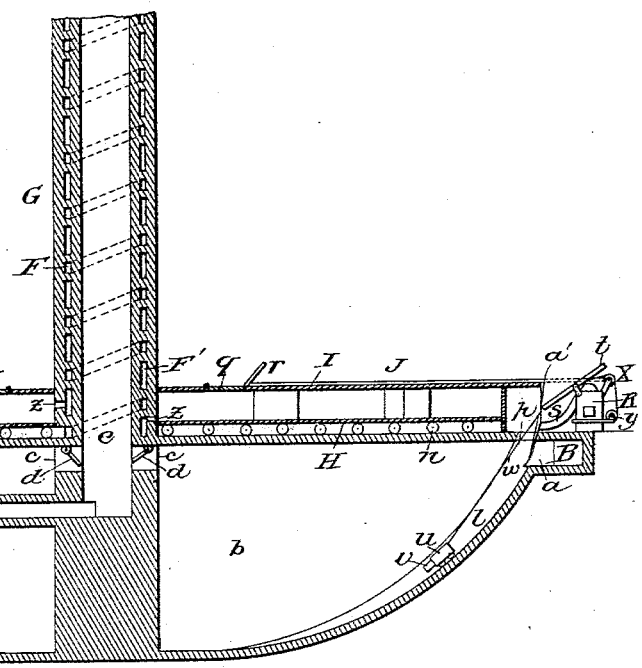
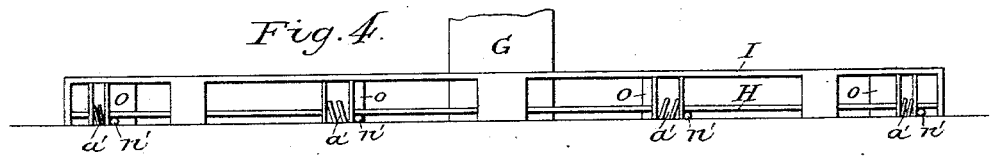
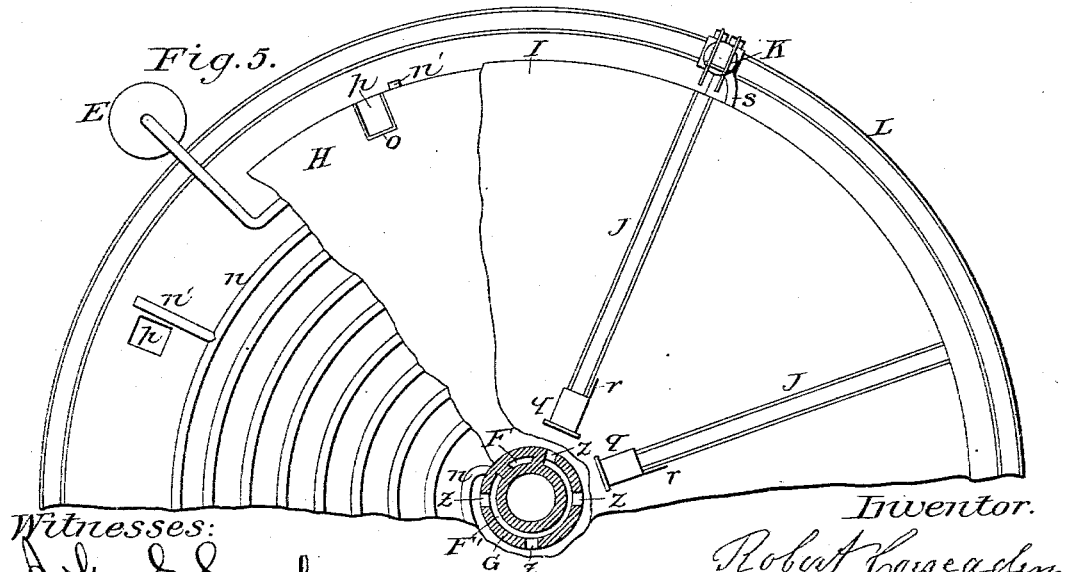

UNITED STATES PATENT OFFICE.

ROBERT CORSCADEN, OF PROVIDENCE, RHODE ISLAND.

APPARATUS FOR COLLECTING AND DRYING THE SEDIMENTARY MATTER OF SEWAGE.

SPECIFICATION forming part of Letters Patent No. 315,912, dated April 14, 1885.

Application filed October 4, 1883. (No model.)

*To all whom it may concern:*

Be it known that I, ROBERT CORSCADEN, of Providence, in the State of Rhode Island, have invented an Improvement in Apparatus for Collecting and Drying the Sedimentary Matter of Sewage, of which the following is a specification.

The nature of my invention consists in the combination of a sewer with two or more catch-basins placed below the bottom line of the bed of the sewer, and having valves or gates at their inlet and outlet openings, whereby the matter flowing through the sewer may be shut off from or be turned into either of the catch-basins, as desired, thus allowing the collected sediment to be removed without at any time obstructing the proper flow of sewage.

It also consists in the combination of a sewer provided with two or more catch-basins placed below the bottom line of the bed of the sewer with a chimney-flue adapted for drawing the foul odors or gases from the sewer and catch-basins.

It also consists in providing the chimney with a spiral flue made in the wall of the chimney, whereby the heat derived from a furnace may be made to accelerate the draft of the chimney-flue for drawing off the sewage-gas.

It also consists in a circular series of sector-formed catch-basins surrounding a centrally-arranged chimney-flue with a furnace and heating-pipes adapted for drying the sedimentary matter of the sewage in order to manufacture a transportable fertilizer therefrom.

It also consists in a circular series of sector-formed catch-basins surrounding a centrally-arranged chimney-flue with a furnace provided with heating-pipes and a heating-floor arranged over the heating-pipe for the deposit of the sedimentary matter of the sewage to be dried, and a circular track for transporting a hoisting-engine from opposite the man-hole of one of the catch-basins of the series to the man-hole of another catch-basin, for the purpose of raising the sedimentary deposit from the catch-basin and transporting the same to the drying-floor.

It also consists in a float placed at the outlet-opening of the catch-basins and adapted to prevent substances that float on the surface of the water from passing off with the overflow.

Figure 1 is a horizontal section on line $x\ x$ of Fig. 3, showing the sector-formed catch-basins, chimney-flue, and parallel catch-basins. Fig. 2 is a vertical section of the parallel catch-basins on line $x'\ x'$ of Fig. 1. Fig. 3 is a vertical section of the chimney, catch-basins, and sewer on line $x\ x$ of Fig. 1. Fig. 4 is an elevation of the drying portion of the apparatus. Fig. 5 is a partial plan view of the same, broken away at one side for the purpose of illustration. Fig. 6 is a horizontal section of the sewer and three parallel catch-basins.

In the accompanying drawings, A is a sewer leading into an annular channel, B, provided with valved or gated openings $a\ a\ a$, through which the sewage will flow into the sector-formed catch-basins C C C, separated from each other by means of the radial partitions $b\ b\ b$. Suitable outlets, $c\ c\ c$, provided with valves or gates $d\ d\ d$, and connecting the catch-basins with the chimney-flue $e$, are provided for the overflow from the catch-basins, and the overflow, after falling to the bottom of the chimney-flue, will pass off through the sewer D, which may be extended to any required distance from the catch-basins, and may be provided with the parallel catch-basins C' C', excavated below the bottom line of the bed of the sewer, and in this case I provide a swinging gate, $f$, pivoted at the end of the partition $g$, which serves to separate the two catch-basins.

Suitable tide-gates, $h\ h$ and $i$, or gates adapted to prevent the outer air from passing through the sewer and up the chimney-flue $e$, may also be provided, the bed of the overflow-sewer D' being made at a lower level than that of the sewer D. The catch-basins C' C' are each provided with a man-hole, $j$, closed by means of a cover, $k$, and through which the collected sedimentary deposit in the catch-basin may be removed by means of a self-loading car or shovel adapted for moving down the curved or inclined side $l$ of the catch-basin. Whenever the gates in the sewer at opposite ends of one of the catch-basins are closed, the flow of sewage will be directed into the opposite catch-basin. Thus the accumulated sediment may be removed by first closing one of the catch-basins and then the other without at any time interfering with the free flow of sewage.

A float, $e'$, may be placed at the outlet of the catch-basin, as shown in Fig. 2, in order to prevent substances that float on the suface of the water from passing off with the overflow, and instead of the two catch-basins C' C', arranged side by side, any desired number of parallel catch-basins may be employed, three such basins being shown in Fig. 6.

A furnace, E, located in a suitable chamber, $m$, is connected with a spiral coil of pipe, $n$, (shown in Fig. 5,) and connecting with the spiral flue F, made in the wall of the chimney G.

Over the spirally-coiled pipe $n$ is placed the metallic floor H, upon which the sediment removed from the catch-basins C is to be placed for the purpose of drying, in order to reduce the sewage-sediment to a proper condition for handling and transportation, and a protecting-flange, $o$, is made around the man-hole $p$ of the catch-basins to prevent the deposited sediment from falling into the man-hole when the same is opened for the purpose of removing the sediment from the catch-basins.

Over the drying-floor H is placed the cover or flat roof I, provided with the radially-directed car-tracks J, extending from the trap-doors $q$ to the outer edge of the roof. The trap-doors $q$ are hinged to the roof at their inner edges, and are provided at one side with an inclined projecting arm, $r$, adapted to come in contact with a projecting pin on the self-loading car, and thus to be automatically raised and lowered by means of the forward and backward movement of the car. The materials raised by the car from the catch-basins are to be dumped through the hatchway under the trap-doors onto the drying-floor below, and evenly spread over the surface of the same, in order to facilitate the drying of the material by the heat derived from the furnace-pipe $n$.

A movable hoisting-engine and boiler, K, is placed on the circular track L, the smoke-pipe $s$ of the boiler being connected with the furnace-pipe $n$ by means of the radial pipes $n'$, arranged, for convenience, near the side of the several man-holes $p$, as shown in Figs. 4 and 5, and thus the escaping heat from the fire-box of the boiler may be made to assist in drying the sewage-sediment deposited on the floor H. Above the boiler K, Fig. 3, is pivoted the tilting track $t$, adapted to receive the loaded car on its upward passage along the curved or inclined side $l$ of the catch-basin, and to transfer the same to the radial tracks J. The car $u$, having floor $v$, has attached thereto a rope, $w$, which passes over a sheave, $x$, to the drum $y$ of the engine.

Openings $z\ z$ are made in the outer wall of the chimney between the drying-floor $n$ and the roof I, connecting with the spiral flue F', and serving to draw off the steam and foul air from the drying sediment on the floor H, and the flues F and F', after circling spirally around the chimney for a sufficient height above the floor, are brought into the central flue, $e$, of the chimney, thus insuring a strong draft. The heat from the furnace, by passing up the spiral flue F, will so heat the lower portion of the chimney as to cause a greatly-increased draft from the sewers and catch-basins.

Short tracks $a'\ a'$ may be made to extend upward from the man-holes $p$ to meet the end of the tilting track of the movable engine located on the circular track L.

The radial pipes $n'$, which connect with the coiled furnace-pipe $n$, are to be closed at their outer ends when not in use by means of a suitable valve or cover.

The openings $a\ a$, through which the sewage flows from the circular channel B to the catch-basins C, are provided with the gates or valves $c'$, by means of which any one of the catch-basins of the series may be shut off from connection with the main sewer A, for the purpose of removing the collected sediment, and upon opening the man-hole $p$ of any of the basins the valve or gate $d$ is to be closed, in order to prevent the outer air from rushing through the man-hole, and thence up the chimney-flue $e$, and thus disturbing the draft.

The overflow-sewer D may be made to pass from the chimney-flue in the line of one of the partition-walls $b$, above the bottom of the catch-basins, as shown in Fig. 3.

The farthest end of each sewer A, connected with the main sewer and catch-basins, is provided with a valve, $b'$, adjusted to admit only sufficient outer air to allow the gases of the sewers to be drawn into the central flue, $e$, of the chimney, and thence into the upper air at the top of the chimney, thus tending to free the city or town from sewer-gas.

I do not herein particularly describe or claim the construction of the car or the means of operating the same to remove the contents of the catch-basins to the drying-floor, as that forms the subject of another application now pending.

Having thus described my invention, what I claim, and desire to secure by Letters Patent, is—

1. The combination, with a sewer, of one or more series of sector-formed catch-basins or precipitating tanks arranged, as described, to freely receive the discharge of said sewer, substantially as described.

2. The combination, with the sewer and the catch-basins with which it is connected, of the chimney having a ventilating-flue for the catch-basins and an independent flue for the furnace, as set forth.

3. The combination, with a series of radial catch-basins, of a circular drain or sewer extending around and communicating with said catch-basins, as set forth.

4. In an apparatus for treating sewage, the combination, with the drying-chamber, the heating devices, and the chimney, of the flue in the chimney and the openings thereinto for the escape of steam and effluvia from the drying-chamber, substantially as set forth.

5. In an apparatus for treating sewage, the combination, with the series of catch-basins or precipitating tanks with their gates, as described, of the sewer delivering thereinto, the discharge sewer or drain, and an automatic gate, $i$, as set forth.

6. The combination of a sewer with two or more catch-basins placed below the bottom line of the bed of the sewer, and having a deck or floor thereover, and man-holes or hatches, and a curved or inclined side extending under the man-hole and adapted for the up-and-down movement of an automatic car or shovel for removing the sedimentary deposit from the catch-basins, substantially as described.

7. The combination of a sewer provided with two or more catch-basins placed below the bottom line of the bed of the sewer, and a ventilating-chimney provided with a spirally-constructed flue made in the wall of the chimney, with a fire chamber or furnace connected with the spiral flue, whereby the base of the chimney may be heated so as as to insure a strong draft up the chimney-flue, substantially as described.

8. The combination of a circular series of sector-formed catch-basins surrounding a centrally-arranged chimney, with a furnace or fire-chamber, heating-pipe, and heating-floor arranged over the heating-pipe, substantially as and for the purpose specified.

9. The combination of a circular series of sector-formed catch-basins surrounding a centrally-arranged chimney, with a furnace or fire-chamber, and a heating-floor with a circular track adapted for transporting a hoisting-engine from the man-hole of one of the catch-basins to the man-hole of another catch-basin, substantially as described.

10. The combination of a circular series of sector-formed catch-basins surrounding a centrally-arranged chimney, with a furnace or fire-chamber and heating-floor, and a cover or roof for the heating-floor provided with trap-doors and radial tracks adapted for transporting the sediment from the catch-basins and depositing the same on the heating-floor, substantially as described.

11. The combination of the spiral flue F', provided with the openings $z\ z$, made in the outer wall of the chimney, with the drying-floor H and roof I, substantially as described.

12. The combination of a sewer, A, and two or more catch-basins placed below the bottom line of the bed of the sewer, with a ventilating chimney-flue and a gate or valve, $b'$, adapted for the admission of only sufficient air to allow the gases of the sewers to be drawn up the chimney-flue, substantially as described.

13. The combination of a sewer and two or more catch-basins placed below the bottom line of the bed of the sewer, with a ventilating chimney-flue, and an overflow-sewer connecting with the chimney-flue at a point below the overflow-outlets of the catch-basins into the chimney-flue, substantially as described.

14. The combination of a sewer and a catch-basin placed below the line of the bed of the sewer, with a float adapted to prevent substances floating on the surface of the water from passing off with the overflow, substantially as described.

ROBERT CORSCADEN.

Witnesses:
   JOHN S. LYNCH,
   SOCRATES S SCHOLFIELD.